UNITED STATES PATENT OFFICE.

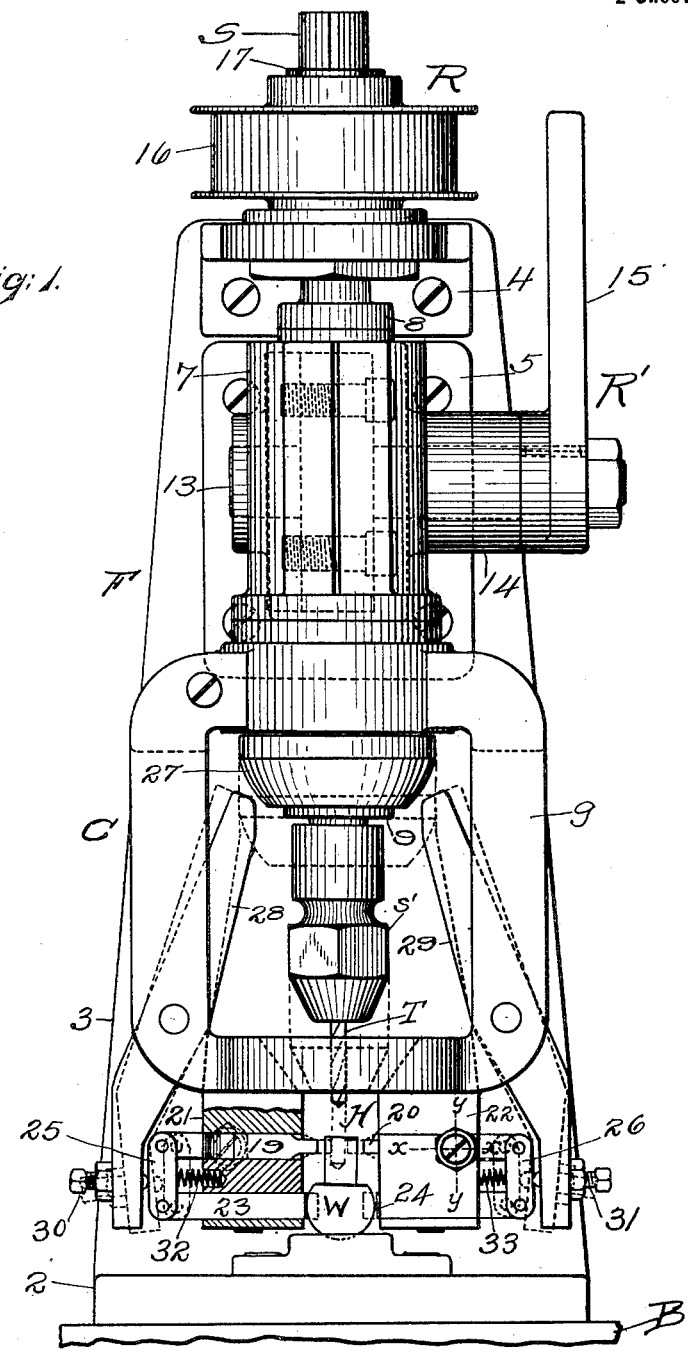

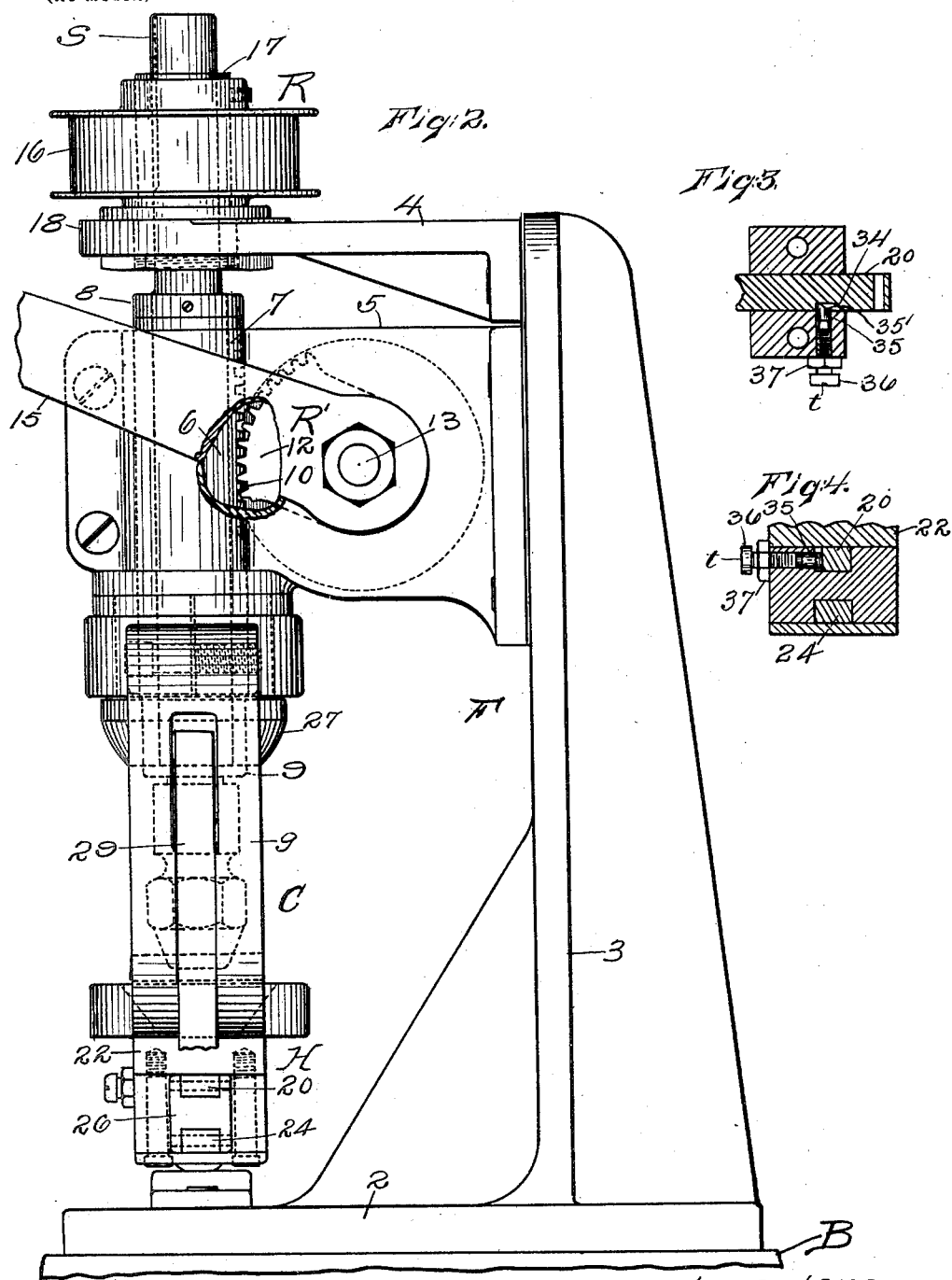

HOWARD N. HINCKLEY AND RUFUS ANDERSON, OF HARTFORD, CONNECTICUT, ASSIGNORS TO THE DWIGHT SLATE MACHINE COMPANY, OF SAME PLACE.

METAL-WORKING MACHINE.

SPECIFICATION forming part of Letters Patent No. 667,880, dated February 12, 1901.

Application filed April 28, 1900. Serial No. 14,690. (No model.)

*To all whom it may concern:*

Be it known that we, HOWARD N. HINCKLEY and RUFUS ANDERSON, citizens of the United States of America, and residents of the city and county of Hartford, in the State of Connecticut, have invented certain new and useful Improvements in Metal-Working Machines, of which the following is a specification.

This invention relates, generically, to a metal-working machine of that class embodying a chuck or work-holder and a rotative tool-holder or spindle disposed in operative relation with said chuck, and more particularly to improved work centering and holding means for a machine of this class.

In metal-working machines of the class above referred to, in which a chuck is employed for holding the work to be operated upon by a rotating tool, no automatically-operative means have been provided, in so far as we are aware, for first accurately centering a piece of work of irregular contour with relation to the axis of the tool and for subsequently engaging and holding the piece of work in its accurately-centered position—that is to say, no independent means have been provided in connection with each jaw of an automatic or universal chucking mechanism whereby the extent of closing movement of each jaw with respect to a center common to all jaws could be arbitrarily varied.

One object of the present invention is to provide, in a metal-working machine of the class specified, improved work centering and holding means embodying a plural number of sets or pairs of jaws adapted for engaging a piece of work of irregular contour at different points in the length thereof and to so construct and organize the elementary features of said means that one pair of jaws have predetermined relative movements with respect to a common center and will operate to engage and accurately center the piece of work with respect to the axis of the tool which is to operate thereon, and the other set of jaws will subsequently grasp the piece of work at a different point in the length thereof and hold the same in its accurately-centered position.

Another object of the invention is to furnish an improved metal-working machine including a spindle supported for rotative and reciprocatory movements, an independent chuck disposed in advance of said spindle and embodying work-grasping jaws, and means in connection with and operative on reciprocative movements of said spindle for automatically operating said jaws.

With these objects in view the invention consists in certain details of construction and in the combination and arrangement of the several parts of the machine, substantially as hereinafter described, and more particularly pointed out in the claims.

In the drawings accompanying and forming part of this specification, Figure 1 is a front elevation, partly in section, of a portion of one form of single-spindle metal-working machine embodying the present invention, said figure showing in full and dotted lines two extreme positions of certain elements of the chuck or work centering and holding mechanism. Fig. 2 is a side elevation of the machine as seen from the right in Fig. 1, parts being broken away. Fig. 3 is a horizontal section of a portion of the chuck or work-holding instrumentalities, taken on a line corresponding with the dotted line $xx$ in Fig. 1 and showing the jaw-stroke-limiting means in connection with one work-centering jaw; and Fig. 4 is a vertical cross-section of the same parts, taken on a line corresponding with the dotted line $yy$ in Fig. 1.

Similar characters refer to like parts in all the figures of the drawings.

In the drawings only so much of one form of metal-working machine is shown as will clearly illustrate the construction, organization, and mode of operation of the several parts comprised in the subject-matter of the present invention, and it is desired to state in this connection that inasmuch as the present improvements are subject to various applications the invention is not limited to the specific machine illustrated in the accompanying drawings, and it is further desired to say that the elementary features may be modified within certain limits as required to adapt them to various forms of metal-working machines without departure from this invention.

In the preferred construction and organization thereof illustrated in the accompanying drawings the metal-working machine (which is in the nature of a single-spindle drill) comprises in its entirety a suitable base B, a portion only of which is shown in the drawings, a main frame or head (designated in a general way by F) supported upon the base B, tool-holding means, including a spindle S, supported on the framework for rotative and reciprocatory movements, rotating means (designated by R) in connection with said spindle, spindle-reciprocating means (designated by R') in connection with said spindle, and work centering and holding means (designated in a general way by H) disposed in advance of the spindle and including work-grasping jaws, and means operated by the spindle on reciprocatory movements thereof for actuating said jaws.

The main frame consists in the form thereof shown in the drawings of a suitable bed-plate 2, an upright 3, and two forwardly-extending brackets, (designated by 4 and 5, respectively,) secured to the upright at different points in the length thereof, and the former of which constitutes a support for the upper end of the spindle S and also for the spindle-rotating means, and the latter of which constitutes a support for the spindle-bearing and the spindle-reciprocating means, and which brackets may be of any suitable general construction.

The spindle S will be provided at the forward or working end thereof with a suitable tool-holder or chuck (shown at s') adapted to receive and hold a tool, such as T, which is shown in the present instance as an ordinary drill.

The means for rotating and for facilitating reciprocatory movements of the spindle may be variously modified within the purview of this invention.

In the present organization the spindle S is shown journaled intermediate its ends in a sleeve or tubular bearing 6, supported for reciprocatory movements in a fixed bearing 7 on the bracket 5, said sleeve or tubular bearing 6 being held as against movement longitudinally of the spindle by means of collars 8 and 9 on the spindle bearing against opposite ends of the sleeve 6. This sleeve 6 is shown in the drawings as one of the constituent elements of the spindle-reciprocating means, it having a rack 10 on the rear face thereof, the teeth of which are in mesh with the teeth of a segment-gear 12, fixed to a shaft 13, journaled in a horizontal bearing 14 on the bracket 5 and which shaft has fixed to the outer end thereof a hand-lever 15, whereby said shaft and segment-gear may be turned to advance and retract the spindle S. The rotating means in connection with the upper end of the spindle is shown consisting of a band-wheel 16, fixed to a sleeve 17, which is splined to the spindle and which is supported for rotative movements in a bearing 18 on the bracket 4 and held as against movement longitudinally of said spindle, said sleeve 17 being shown in dotted lines in Fig. 2.

In the preferred construction and organization thereof shown in the accompanying drawings the work centering and holding means consists, essentially, of a centrally-recessed chuck-head (designated in a general way by C) fixedly supported in advance of the forward end of the spindle, preferably by means of an open frame g, having a split sleeve at the upper end thereof surrounding and fixedly secured to a tubular projection on the bearing 7 of the bracket 5, in which the spindle-receiving sleeve 6 is supported for reciprocatory movements, a pair or set of work-centering jaws 19 and 20, extending preferably entirely through the walls 21 and 22 of said head and supported for reciprocatory movements toward and from a common center in a plane at right angles to and intersecting the plane of the axis of the spindle S, a pair or set of work-holding jaws 23 and 24, disposed in parallelism with and below the jaws 19 and 20, links 25 and 26, pivotally connecting the outer ends of said jaws, and jaw-actuating means consisting of a cam or jaw lever actuator 27, fixed to have a reciprocatory movement with the spindle S, a pair of jaw-actuating levers 28 and 29, pivotally supported intermediate their ends on the open framework g and having their upper ends disposed in the path of the working face of the cam 27 and having at the lower ends thereof adjustably-supported members 30 and 31 in bearing engagement with the connecting-links of the jaws, and jaw-retracting means (shown as springs 32 and 33) disposed between the links and walls 21 and 22 of the head and effective for automatically imparting retractive movements to the jaws upon a release of the jaw-actuating lever.

It is distinctly to be understood that the invention is not limited to the particular construction and organization of chuck-head illustrated in the accompanying drawings, as this may be modified within certain limits to meet the requirements.

To facilitate the accurate centering of a piece of work, as W, which is of different diameters at different points in the length thereof, and firmly grasp and hold the same in its accurately-centered position with respect to the tool, such as T, it is necessary to provide means whereby the advancing or closing movements of the so-called "centering-jaws" may be independently regulated with respect to a predetermined point intersected by the plane of the axis of the tool, so that all of the centering-jaws will engage the piece of work in such manner as will accurately position it with respect to the tool, notwithstanding the fact that it may be desirable to operate upon the piece of work slightly at one side its center. In other words, instead of determining the position of the working faces of the jaws by the position of the piece of work, as in universal chucking devices of ordinary construction, the position of a piece of work is in this case determined by the position of the working faces of the jaws after they have arrived at their full-stroke position, the independent adjustment of the working strokes of the centering-jaws effecting the desired adjustment of the piece of work transversely of the plane of the tool without any bodily adjustment of the chuck-head. This, in so far as we are aware, is radically new in chuck devices, as in all known automatic chuck devices adapted for holding a piece of work to be operated upon by an independent tool no means have been provided for independently adjusting or limiting the closing movements of the chuck-jaws, and for this reason (said jaws all operating in unison and having the same throw) it is absolutely necessary that the chuck-head be originally fixed in such position that a central point between opposing jaws will be coincident with the axis of the tool, and while it is not extremely difficult to secure this exact adjustment of the chuck-head in assembling a new machine it is extremely difficult to sustain this exact adjustment, for the reason that not only are the jaws subject to more or less wear, but the tool-spindle and supports for the chuck-head and spindle are all subject to distortion and misalinement. Therefore the advantage of providing a chuck device in which the precisionized centering of the chuck-head with relation to the axis of the tool is not absolutely necessary to the accuracy of the operation of the tool upon the work and in which the precisionizing of the work is effected by the independent adjustment of the jaws will be readily appreciated by those skilled in this art, as with a chuck embodying this invention it will be a very simple matter to independently adjust the jaws so as limit their closing movements and compensate for any variation in position of the working faces of the jaws due to wear or to the misalinement of the central portion of the chuck-head with respect to the axis of the tool. To secure these advantages, there is provided in connection with each centering-jaw, as 19 and 20, an arbitrarily-adjustable jaw-stroke-limiting device, which in the preferred form thereof shown most clearly in Figs. 3 and 4 consists of an inclined abutment or face 34 on the jaw and a stop $t$ adjustably supported in the chuck-head and having an inclined stop-face 35' disposed in the path of the abutment-face. This adjustable stop in the preferred construction thereof shown in the drawings consists of a stop member 35, supported for adjustment transversely of the path of movement of the jaw and having the inclined stop-face 35', an adjusting-screw 36, having a screw-threaded bearing in the wall of the chuck and bearing at its inner end against the stop member, and a jam-nut 37 for holding the screw in its adjusted position.

Inasmuch as the jaw-stroke-limiting means in connection with both centering-jaws 19 and 20 are of substantially duplicate construction and organization the parts of said jaw-stroke-limiting means are for convenience designated by the same characters in Figs. 3 and 5.

From the above description it will be seen that to secure a longer or shorter stroke of the jaw it is simply necessary to move the adjusting-screw 36 outward or inward, as required.

In the drawings only two pairs of jaws are shown; but it will be obvious that the chuck-head might be provided with any number or pairs of jaws. Furthermore, it is to be understood that this invention is not limited to the employment of a set of centering-jaws and a set of work grasping and holding jaws, as it will be obvious that the centering-jaws might in some cases be used both as centering and as grasping and holding jaws.

In the construction and organization of jaws shown in the accompanying drawings the centering-jaws will on a jaw-advancing movement of the levers 28 and 29 be first moved to their full work-centering position or until the advancing movements thereof are arrested by the limiting devices, after which the work-grasping jaws, which have also had an advancing movement in synchronism with the centering-jaws, have a continued advancing movement imparted to them until they have arrived at their work grasping and holding positions. On the release of the jaw-actuating levers by the retractive movement of the spindle and cam which operate said levers the jaws will be automatically retracted by means of the springs 32 and 33. It will be obvious, however, that other means than springs may be employed for imparting retractive movements to the jaws.

We claim—

1. In a metal-working machine, the combination with a chuck embodying two jaws supported for movements toward and away from each other, of means for imparting working strokes concurrently to said jaws; and independent and arbitrarily-adjustable jaw-stroke-limiting devices one in connection with each jaw.

2. The combination, with a rotative tool-holder supported for reciprocatory movements and with means for actuating the same, of an independent chuck embodying two jaws supported for reciprocatory movements toward and away from each other in a common plane at right angles to the axis of the tool-holder; means operated by the tool-holder, on a reciprocatory movement thereof, for actuating the jaws; and an arbitrarily-adjustable jaw-stroke-limiting device in connection with each jaw.

3. The combination with a tool-holder, of a work holder or chuck embodying a set of work-centering jaws and a set of work-holding jaws adapted, respectively, for engaging a piece of work at different points in the length thereof; and means for actuating said jaws.

4. A metal-working machine embodying a chuck having two independent sets of work-grasping jaws disposed, respectively, to engage a piece of work at different points in the length thereof; and actuating means in connection with said jaws.

5. A metal-working machine including a chuck having two independent sets of jaws disposed to engage a piece of work at different points in the length thereof; and means for closing the two sets of jaws upon a piece of work in successive order.

6. In a metal-working machine, the combination with a rotary spindle supported for reciprocatory movements and with rotating and reciprocating means therefor, of a stationary chuck-head supported in advance of said spindle; two reactionary work-centering jaws supported in said head for reciprocatory movements in a common plane at right angles to the axis of the spindle; means controlled by the spindle, on a reciprocatory movement thereof, for actuating said jaws and including a cam carried by the spindle and pivoted levers having opposing ends in operative relation, respectively, with the cam and jaws; and arbitrarily-adjustable jaw-stroke-limiting devices one in connection with each jaw.

7. In a metal-working machine the combination, with a rotative tool-holder and its rotating means, of work-holding means including two parallel sets of work-grasping jaws disposed to engage a piece of work at different points in the length thereof; and jaw-actuating means effective for closing the two sets of jaws upon the piece of work in successive order.

8. In a metal-working machine, the combination with a rotative tool-holder supported for reciprocatory movements and with independent means for rotating and reciprocating the same, of a chuck-head fixedly supported in advance of the tool-holder; two opposing jaws supported in said head for movement in paths at right angles to, and intersecting the plane of the axis of, the tool-holder and each having a stop-abutment; springs for imparting independent movements to said jaws in one direction; means controlled by the tool-holder, on reciprocations thereof, for imparting concurrent movements to said jaws in another direction and including a lever-actuating cam in connection with the tool-holder; and pivotally-supported levers each having one end thereof in connection with one jaw and having the opposite end thereof disposed in the path of movement of the lever-actuating cam; and an arbitrarily-adjustable stop device having an inclined face disposed in the path of the stop abutment of each jaw.

9. In a metal-working machine the combination of a stationary chuck device embodying two sets of work-engaging jaws disposed to engage a piece of work at different points in the length thereof; automatically-operative means for imparting advancing movements to said jaws; and automatically-operative retracting means in connection with said jaws.

10. The combination, with a rotative tool-holder and with rotating means therefor, of work-holding means including two parallel sets of work-grasping jaws; and automatically-operative means controlled by the tool-holder and effective for advancing both sets of jaws simultaneously a predetermined distance, or until one set of jaws is in its work-engaging position, and then further advancing one set of jaws independently to its work-engaging position.

11. In a metal-working machine the combination, with a tool-carrying spindle supported for rotative and reciprocatory movements, of a stationary chuck having two independent sets of work-grasping jaws supported for reciprocatory movements in parallel planes intersecting the path of reciprocation of the spindle; and automatically-operative jaw-actuating means consisting of a cam fixed to the spindle, and levers having their inner ends disposed in the path of movement of the cam and having their outer ends in operative connection with the work-grasping jaws whereby on an advancing movement of the spindle a work-grasping movement will be imparted to said jaws.

12. In a metal-working machine, the combination with a vertically-disposed tool-holding spindle supported for rotative and reciprocatory movements, and with independent means for imparting these movements to said spindle, of a centrally-recessed chuck-head fixedly supported in advance of said spindle; axially-alined jaws supported independent of their actuating means in said chuck-head for movements toward and from a common center in a horizontal plane intersecting the plane of the axis of the spindle; automatic means controlled by the reciprocatory movements of said spindle for imparting concurrent advancing movements to said jaws; independent arbitrarily-adjustable means for limiting the advancing movements of said jaws; and automatically-operative retracting means in connection with said jaws.

13. The combination with a chuck-head, of a pair of reactionary jaws supported to have advancing movements toward each other and toward a common center; automatically-operative means for imparting concurrent advancing movement to the jaws; and adjustable jaw-stroke-limiting means in connection with said head and jaws and effective for arbitrarily varying the extent of advancing movements of said jaws.

14. The combination with a centrally-recessed chuck-head, of work-grasping jaws extending entirely through the walls of said chuck-head and operable from the outside thereof; an adjustable jaw-stroke-limiting device in operative connection with each jaw and effective for limiting the movement of said jaw with respect to a center common to all the jaws; automatically-operative jaw-actuating means having a connection with said jaws outside the chuck-head; and automatically-operative retracting means in connection with said jaws.

15. The combination with a chuck-head, of a pair of centering-jaws disposed in axial alinement for movement toward a common center; a pair of work-holding jaws disposed in parallelism with the centering-jaws for movements toward and from a common center; links pivotally connecting the outer ends of the centering-jaws and work-holding jaws; an arbitrarily-adjustable jaw-stroke-limiting device in connection with each centering-jaw and effective for arresting the advancing movement of said jaw when its working face has arrived at a predetermined point with respect to said common center; automatically-operative means for advancing the centering-jaws and work-holding jaws concurrently until the centering-jaws are arrested in their advancing movements by the limiting means and for then continuing the advancing movements of the work-holding jaws until their working faces engage the piece of work; and automatically-operative retracting means in connection with said jaws.

16. The combination with a chuck-head, of a series of jaws supported for movements toward and from a common center and each having an inclined abutment-face; an adjustable stop carried by the chuck-head and having an inclined face disposed in the path of the abutment-face of the jaw, said stop being supported for adjustment in a plane intersecting the path of the jaw and being adapted for limiting the advancing movement of said jaw with respect to said common center, and means for actuating said jaws.

17. The combination with a chuck-head, of a series of jaws supported for movements toward and from a common center and each having an inclined abutment-face; a stop supported by the head for adjustment in a path intersecting the path of the jaw and having an inclined face disposed in the path of the abutment-face of the jaw, and being adapted for limiting the advancing movement of said jaw with respect to a common center; automatically-operative means for imparting advancing movements to said jaws; and springs for retracting said jaws on the release of the jaw-advancing means.

18. In a metal-working machine the combination, with a suitable frame having a spindle-supporting bearing, of a spindle supported for rotative and reciprocative movements in said bearing; a chuck-head including an open frame secured to the spindle-bearing; two sets of work-engaging jaws disposed in said head in advance of the spindle for movement in a plane intersecting the plane of the axis of said spindle, and the jaws of one set being disposed above and in parallelism with the jaws of the other set; links pivotally connecting the jaws of the two sets; a cam or jaw lever actuator fixed to the spindle; pivotally-supported jaw-actuating levers having their inner ends disposed in the path of the cam and having adjustable members at their lower ends in bearing engagement with the links connecting the two sets of jaws, and effective, on the advancing movement of the cam, for imparting a work-engaging movement to said jaws; and automatically-operative retracting means in connection with said jaws.

19. The combination, with a chuck-head, of a series of jaws; jaw-actuating means; and arbitrarily-adjustable jaw-stroke-limiting means, independent of the jaw-actuating means in connection with each jaw and effective for determining the extent of closing movement of said jaw with respect to a predetermined point.

Signed by us at Hartford, Connecticut, this 26th day of April, A. D. 1900.

HOWARD N. HINCKLEY.
RUFUS ANDERSON.

Witnesses:
E. C. WHITNEY,
L. C. WOOD.